(12) United States Patent
Vasamsetti et al.

(10) Patent No.: US 6,742,029 B2
(45) Date of Patent: May 25, 2004

(54) NETWORK PROFILING SYSTEM

(75) Inventors: Satyan Vasamsetti, Danville, CA (US);
Thomas Edward Lilley, Sunnyvale, CA (US)

(73) Assignee: Covad Communications Group, Inc., Santa Clara, CA (US)

( * ) Notice: Subject to any disclaimer, the term of this patent is extended or adjusted under 35 U.S.C. 154(b) by 0 days.

(21) Appl. No.: 10/426,506

(22) Filed: Apr. 29, 2003

(65) Prior Publication Data

US 2003/0200287 A1 Oct. 23, 2003

Related U.S. Application Data

(62) Division of application No. 09/457,605, filed on Dec. 8, 1999, now Pat. No. 6,594,695.

(51) Int. Cl.[7] ............................................. G06F 15/173
(52) U.S. Cl. ....................... 709/223; 709/226; 714/21
(58) Field of Search ................................. 709/203, 220, 709/221, 223, 224, 225, 226, 229, 245; 707/1, 10; 715/500, 504; 714/1, 21

(56) References Cited

U.S. PATENT DOCUMENTS 5,806,057 A * 9/1998 Gormley et al. ............... 707/1
6,065,017 A * 5/2000 Barker ......................... 707/202
6,243,737 B1 * 6/2001 Flanagan et al. ............ 709/202
6,594,695 B1 * 7/2003 Vasamsetti et al. .......... 709/220

* cited by examiner

Primary Examiner—Mehmet B. Geckil
(74) Attorney, Agent, or Firm—Jung-hua Kuo

(57) ABSTRACT

Systems and methods for network profiling that may be used by a provider of high bandwidth connections to facilitate connectivity and service order entry by customers are disclosed. Typically, the customer has a plurality of client. The network profiling method generally comprises specifying at least one network configuration profile, the specifying including selecting a preferred CPE, selecting a network mode, selecting a network feature, selecting at least one network feature parameter including a static parameter, and defining a value for the static network feature parameter, wherein the network configuration profile includes at least one dynamic network feature parameter, the dynamic parameter having an unspecified value in the network configuration profile. The method further includes selecting one of the at least one network configuration profile and specifying values for the at least one dynamic parameter and optionally includes a validation process for validating the specification of the preferred CPE, the network mode, the network feature, the network feature parameter, and the value for the static network feature parameter. The selecting the preferred CPE may be before or after selecting the network mode and network feature.

4 Claims, 6 Drawing Sheets

| Mode | Feature Type | Feature | CPE Support | Additional Dependencies |
|---|---|---|---|---|
| Bridge | General | System Name | Verify | Note 1 |
| | | Login | Verify | Note 1 |
| | | SNMPv1 | Verify | Note 1 |
| | | Spanning-Tree Protocol | Verify | |
| | IP Address | IP Enabled | Verify | |
| | | IP Not Enabled | Always | |
| | DHCP | No DHCP | Always | |
| | | DHCP Server | Verify | Note 1 |
| Route | General | System Name | Always | |
| | | Login | Always | |
| | | SNMPv1 | Verify | |
| | | NAT | Verify | Note 2 |
| | LAN IP | Numbered | Always | |
| | LAN Routing Protocol | Static (None) | Always | |
| | | RIP-1 | Verify | |
| | | RIP-2 | Verify | |
| | | RIP-1/2 Compatible | Verify | |
| | WAN IP | Numbered | Always | |
| | | Unnumbered | Verify | |
| | WAN Routing Protocol | Static (None) | Always | |
| | | RIP-1 | Verify | |
| | | RIP-2 | Verify | |
| | | RIP-1/2 Compatible | Verify | |
| | DHCP | No DHCP | Always | |
| | | DHCP Server | Verify | |
| | | DHCP Relay | Verify | |
| PPP | General | Compression | Verify | |
| | Authentication | No Authentication | Always | |
| | | PAP | Verify | |
| | | CHAP | Verify | |
| | WAN IP | PPP Assigned | Verify | Mode: Route |
| | IP Address | PPP Assigned | Verify | Mode: Bridge |
| Multiprotocol | None | | | |

Note 1: IP Address: IP Enabled OR PPP Assigned
Note 2: WAN IP: Numbered OR PPP Assigned

FIG. 3

| Feature | Parameter | Value | Information Type | Default Value | Default Status |
|---|---|---|---|---|---|
| System Name | System Name | Required | String | <none> | Static |
| Login | Username | Required | String | <customer default> | Static |
| | Password | Required | Password String | <customer default> | Static |
| SNMPv1 | Read Community String | Optional | Password String | <none> | Static |
| | Read/Write Community String | Optional | Password String | <none> | Static |
| | Trap Destination | Optional | IP Address | <none> | Static |
| Spanning-Tree Protocol | None | | | | |
| IP Enabled | IP Address | Required | IP Address | <none> | Dynamic |
| | IP Subnet Size | Required | Enumerated Integer | <none> | Dynamic |
| IP Not Enabled | None | | | | |
| NAT | Email Server Address | Optional | Member IP Address | <none> | Static |
| | Web Server Address | Optional | Member IP Address | <none> | Static |
| | X Host Address | Optional | Member IP Address | <none> | Static |
| | Telnet Host Address | Optional | Member IP Address | <none> | Static |
| Numbered | IP Address | Required | IP Address | <none> | Dynamic |
| | IP Subnet Size | Required | Enumerated Integer | <none> | Dynamic |
| Unnumbered | None | | | | |
| Static (None) | None | | | | |
| RIP-1 | None | | | | |
| RIP-2 | None | | | | |
| RIP-1/2 Compatible | None | | | | |
| DHCP Server | Start Address | Optional | Member IP Address | <none> | Static |
| | End Address | Optional | Member IP Address | <none> | Static |
| | DNS Domain | Optional | Domain Nanme | <none> | Static |
| | Primary DNS Server | Optional | IP Address | <none> | Static |
| | Secondary DNS Server | Optional | IP Address | <none> | Static |
| | Primary WINS Server | Optional | IP Address | <none> | Static |
| | Secondary WINS Server | Optional | IP Address | <none> | Static |
| DHCP Relay | DHCP Server Address | Required | IP Address | <none> | Static |
| PAP | System Name | Required | String | <none> | Static |
| | Password | Required | Password String | <none> | Static |
| CHAP | System Name | Required | String | <none> | Static |
| | Password | Required | Password String | <none> | Static |
| PPP Assigned | None | | | | |

FIG. 4

| Template Name | Modes | Features | Parms | Stat |
|---|---|---|---|---|
| Bridge | Forwarding: Bridge | System Name: No | | |
| | | Login: No | | |
| | | SNMPv1: Yes | | |
| | | Spanning-Tree Protocol: No | | |
| | | IP Not Enabled | | |
| | | No DHCP | | |
| | WAN Encapsulation: Multiprotocol | None | | |
| Static | Forwarding: Route | System Name: No | | |
| | | Login: Yes | | |
| | | SNMPv1: Yes | | |
| | | NAT: No | | |
| | | LAN Routing Protocol: Static (None) | | |
| | | WAN IP: Numbered | | |
| | | WAN Routing Protocol: Static (None) | | |
| | | DHCP: No DHCP | | |
| | WAN Encapsulation: Multiprotocol | | | |
| WANRIP | Forwarding: Route | System Name: No | | |
| | | Login: Yes | | |
| | | SNMPv1: Yes | | |
| | | NAT: No | | |
| | | LAN Routing Protocol: Static (None) | | |
| | | WAN IP: Numbered | | |
| | | WAN Routing Protocol: RIP-1/2 Compatible | | |
| | | DHCP: No DHCP | | |
| | WAN Encapsulation: Multiprotocol | | | |
| BothRIP | Forwarding: Route | System Name: No | | |
| | | Login: Yes | | |
| | | SNMPv1: Yes | | |
| | | NAT: No | | |
| | | LAN Routing Protocol: RIP-1/2 Compatible | | |
| | | WAN IP: Numbered | | |
| | | WAN Routing Protocol: RIP-1/2 Compatible | | |
| | | DHCP: No DHCP | | |
| | WAN Encapsulation: Multiprotocol | | | |

FIG. 5

NETWORK PROFILING SYSTEM

This is a divisional of application Ser. No. 09/457,605 filed Dec. 8, 1999, now U.S. Pat. No. 6,594,695.

BACKGROUND OF THE INVENTION

1. Field of the Invention

The present invention relates generally to telecommunications. More specifically, a network profiling system that may be used by a provider of high bandwidth connections to facilitate connectivity and service order entry by customers and/or clients is disclosed.

2. Description of Related Art

With the increasing popularity of the Internet and telecommuting, service providers such as DSL and Internet cable providers are providing more and more high bandwidth connections to users at remote locations such as homes, home offices, and corporations. Examples of high bandwidth connection service providers include incumbent local exchange carriers (ILECs) such as Pacific Bell or PacBell of California and competitive local exchange carriers (CLECs) such as Covad Communications Group, Inc., assignee of the subject patent application. The ILECs and CLECs are collectively referred to herein as LECs.

LECs typically have numerous customers such as Internet service providers (ISPs) and/or corporations. Each ISP generally allows Internet access by its subscribers via the ISP while each corporation allows access by its employees, contractors, and/or other parties to its corporate network and/or the Internet via the corporate network. These ISP subscribers and corporate employees, contractors, etc. are generally referred to herein as the end users or clients of the customers.

The LEC generally provides layer 2, such as ATM layer, connectivity while the customers generally provide layer 3, such as IP layer, connectivity to the clients. The entry of connectivity and service order often requires the input of various network configuration information by the customer and, optionally, by the client., in order for the LEC to provide layer 2 connectivity, for example. In addition, a client premise equipment (CPE) is typically installed at the premise of each client and network configuration data is generally utilized to configure the CPE, such as by downloading the network configuration data to the CPE.

One method for collecting the network configuration data includes providing an interface which serves to collect both the network configuration data and information specific to a particular client. The interface may comprise a set of web-based order forms accessible to the customers from the LEC via the Internet, for example. The order forms obtain the order information for each client and thus obtain client-specific information such as the client site and the client's CPE technical parameters.

However, such an interface may be inefficient. For example, the order forms require the input of all parameters such that, although certain network configuration parameters may be similar or identical for several or all of the customer's clients, the same information must be inputted for each client. Such redundancy or multiple inputs of the same information not only leads to inefficiency but also may serve as a source for errors.

In addition, although the order forms require the input of client-specific information, certain client-specific information, such as the client location and certain IP-level information, may not be available at the time of the ordering. Because certain client-specific information may not be available at the time of the service ordering, the customer may input temporary client configurations which are to be replaced with the actual configurations at a later time. Such a workaround can complicate both the support and the training processes for the ordering process.

The unavailability of certain client-specific information at the time of the ordering can also result in additional order information obtaining processes that must be undertaken in order to complete the ordering process. Such additional order information obtaining processes may include subsequent communication with the customer or the client via the telephone or other mechanisms. As is evident, such additional order information obtaining processes further decreases the overall efficiency and complexity of the ordering process.

The above-described interface also may not include verification processes for verification of data taken during the initial order information obtaining processes as well as data taken during the subsequent additional order information obtaining processes. Thus, the data taken during the various stages of the order taking process may not be compatible or valid. Thus, certain orders may need to be rejected due to insufficient or conflicting network configuration data.

It would thus be desirable to simplify and improve the user-friendliness, efficiency, and accuracy of order entry process such that errors and redundant data entries are minimized.

SUMMARY OF THE INVENTION

Systems and methods for network profiling that may be used by a provider of high bandwidth connections to facilitate connectivity and service order entry by customers and/or clients are disclosed. It should be appreciated that the present invention can be implemented in numerous ways, including as a process, a system, a method, or a computer readable medium such as a computer readable storage medium or a computer network wherein program instructions are sent over optical or electronic communication lines. Several inventive embodiments of the present invention are described below.

A method for ordering client service by a customer from a service provider, the customer having a plurality of clients, generally comprises specifying at least one network configuration profile, the specifying including selecting a preferred CPE, selecting a network mode, selecting a network feature, selecting at least one network feature parameter including a static parameter, and defining a value for the static network feature parameter, wherein the network configuration profile includes at least one dynamic network feature parameter, the dynamic parameter having an unspecified value in the network configuration profile. The method further includes selecting one of the at least one network configuration profile and specifying values for the at least one dynamic parameter.

The specifying at least one network configuration profile may further include a validation process for validating the specification of the preferred CPE, the network mode, the network feature, the network feature parameter, and the value for the static network feature parameter.

The specification of the preferred CPE may be performed before selecting the network mode and network feature. Alternatively, the selecting the preferred CPE may be from a list of CPEs supporting the selected network mode and selected network feature. Further, the specification of at least one network configuration profile may include specification of at least one dynamic network feature parameter. The specification of at least one network configuration profile further includes specification of at most one mode for each mode type. Specification of at most one mode for each mode type may optionally include specification of at most one mode for each of forwarding type mode and WAN encapsulation type mode, wherein specification of at most one mode for the forwarding type mode may include specification of one of bridging mode and routing mode and wherein specification of at most one mode for the WAN encapsulation type mode may include specification of one of multi-protocol mode and PPP mode.

A method for specification of a network configuration profile for ordering client service by a customer from a service provider, wherein the customer has a plurality of clients, is also disclosed. The method generally includes providing a list of supported CPEs, selecting at least one CPE from the list of supported CPEs, providing modes supported by the selected CPE, selecting at least one mode from the modes supported by each selected CPE, providing features corresponding to the at least one selected mode of the selected CPEs, selecting at least one feature corresponding to the selected mode, providing parameters corresponding to the selected feature of the selected CPE, specifying at least one of the parameters as a static parameter, defining each static parameter, and specifying at least one of the parameters as a dynamic parameter, the dynamic parameter having an undefined value in the network configuration profile.

The method may further include validating each of selecting the mode, selecting the feature, specifying the static parameter, defining the static parameter, and specifying the dynamic parameter.

A method for specification of a network configuration profile for ordering client service by a customer having a plurality of clients from a service provider generally comprises providing a list of supported CPEs, selecting none of the CPEs from the list of supported CPEs, providing modes supported by each of the supported CPE, selecting at least one mode from the modes supported by the supported CPEs, providing features corresponding to the at least one selected mode, selecting at least one feature corresponding to the selected mode, providing parameters corresponding to the selected feature of the selected mode, specifying at least one of the parameters as a static parameter, defining each static parameter, specifying at least one of the parameters as a dynamic parameter, the dynamic parameter having an undefined value in the network configuration profile, providing a list of matching CPEs supporting the selected mode and feature, and selecting at least one preferred CPE from the list of matching CPEs.

The method may further include validating each of selecting the feature, specifying the static parameter, defining the static parameter, and specifying the dynamic parameter.

A network profiling system comprises a database of supported CPEs, a database of mode types corresponding to each supported CPE, a database of modes corresponding to each mode type for each support CPE, a database of features corresponding to each mode, a database of parameters corresponding to each feature, and a validation engine for validating selections of mode, feature, parameter, and value of parameter. The validation engine may comprises rules for determining invalid selections of mode, feature, parameter, and value of parameter. The network profiling system may further include a database of default values for each parameter and/or at least one profile template, each profile template having a set of predefined mode, feature, parameter, and value of parameter.

The network profile system allows the customer to specify one or more network and CPE configuration profiles. The profiles serve as basis for client service order entry such that the information that is the same for several of the clients are embodied within the profile and such that only the client-specific information need to be entered during the client service order process. The specification of the one or more network configuration profiles can be complete by the customers of the LEC, for example, in a one-time, up-front process and, optionally, other subsequent process to implement modifications or to specify additional network configuration profiles, for example.

Each profile contains network configuration information that is common to all or a subset of the clients or CPEs of the customer. In other words, the profile system enables the customers to specify the functionality that is shared among the various CPEs such that generic profiles can be created. The network profile system ensures compatibility of desired features and the selected preferred CPEs via its verification process.

The network profile system preferably includes one or more templates containing predefined configurations such that the customer may simplify utilize one or more of the network profile templates without modifications so as to further simplify the customer network configuration set-up process.

The network profile system enables support of CPE features requested by customer. Such CPE features may include, authentication, compression, and dynamic address assignment for PPP configuration, IP unnumbered configuration, Dynamic Host Configuration Protocol (DHCP) parameters such as DNS and Windows Internet Naming Service (WINS) information, as well as simple network management protocol (SNMP) configuration.

The network profile system allows the customers to offer a large number of CPEs to its clients by automatically determining which CPEs support the customer's network configuration. The network profile system also provides a framework for the LEC to more easily extend its offerings of CPEs and network features which can be available after codifying the additional CPEs and/or network features into the network profile system.

During the client ordering process, the profiles created by the network profile system allows the customer to specify the values of only the parameters of the client-specific network features. In other words, by referencing the stored customer profile information in the network profile system, the client service order entry pages only generally require information that is client-specific. Thus, the network profile system simplifies client ordering by minimizing the amount of technical information required during client service order entry.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 3 is a table illustrating some examples of features and their categorization;

FIG. 4 is a table illustrating examples of features and their associated parameters;

FIG. 5 shows four sample templates and their associated modes and features; and

DESCRIPTION OF SPECIFIC EMBODIMENTS

A network profiling system that may be used by a provider of high bandwidth connections to facilitate connectivity and service order entry by customers and/or clients is disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention may not be described or shown in detail so as not to unnecessarily obscure the present invention.

Figure 1:
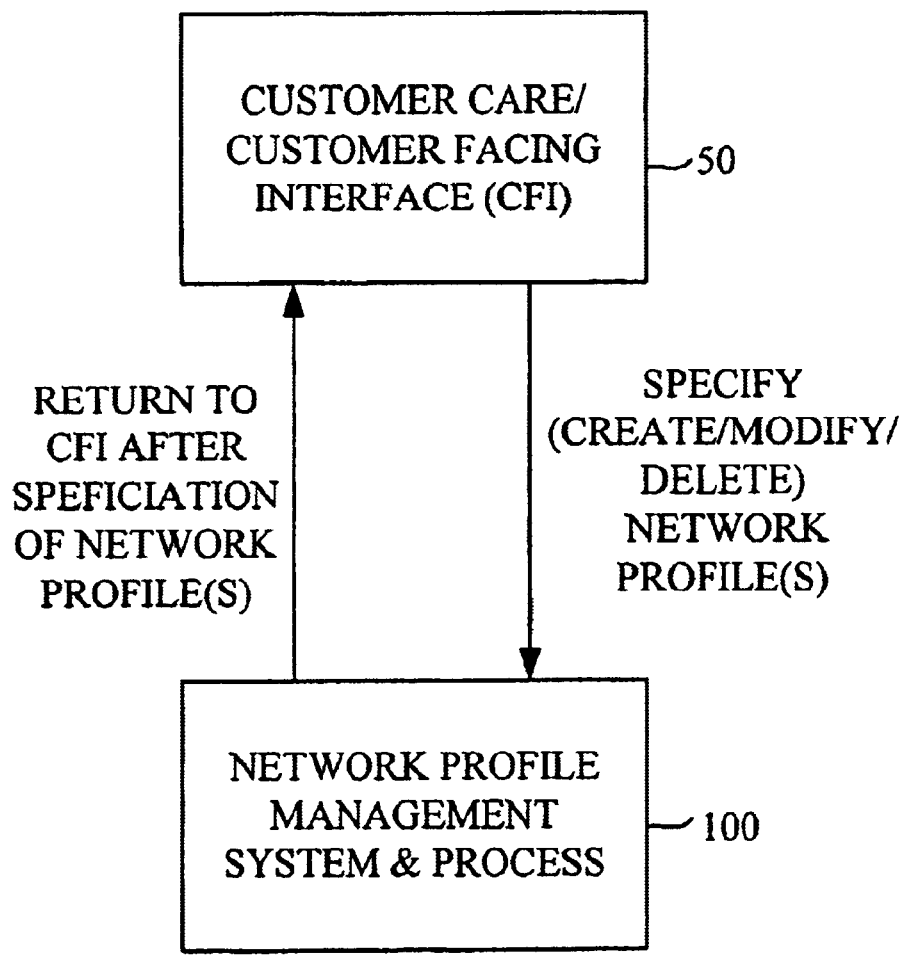
FIG. 1 is a block diagram illustrating a Customer Facing Interface and a profile management system and process.

FIG. 1 is a block diagram illustrating a customer care or customer facing interface (CFI) 50 and a profile management system and process 100. The CFI 50 preferably interfaces with the customer via a customer web interface, for example. The customer may enter various inputs such as the customer identification and password at the CFI 50 in order to access the customer's database and account. The customer may enter the network profile management system and process 100 in order to specify, e.g., create, modify, or delete, one or more network profiles.

The network profile system 100 allows the customer to specify one or more network and CPE configuration profiles. The profiles serve as basis for client service order entry such that the information that is the same for several of the clients are embodied within the profile and such that only the client-specific information need to be entered during the client service order process. The specification of the one or more network configuration profiles can be complete by the customers of the LEC, for example, in a one-time, up-front process and, optionally, other subsequent process to implement modifications or to specify additional network configuration profiles, for example.

Each profile contains network configuration information that is common to all or a subset of the clients or CPEs of the customer. In other words, the network profile system 100 enables the customers to specify the functionality that is shared among the various CPEs such that generic profiles can be created. The network profile system 100 ensures compatibility of desired features and the selected preferred CPEs via its verification process.

The network profile system 100 preferably includes one or more templates containing predefined configurations such that the customer may simplify utilize one or more of the network profile templates without modifications so as to further simplify the customer network configuration set-up process.

The network profile system 100 enables support of CPE features requested by customer. Such CPE features may include, authentication, compression, and dynamic address assignment for PPP configuration, IP unnumbered configuration, Dynamic Host Configuration Protocol (DHCP) parameters such as DNS and Windows Internet Naming Service (WINS) information, as well as Simple Network Management Protocol (SNMP) configuration.

The network profile system 100 allows the customers to offer a large number of CPEs to its clients by automatically determining which CPEs support the customer's network configuration. The network profile system 100 also provides a framework for the LEC to more easily extend its offerings of CPEs and network features which can be available after codifying the additional CPEs and/or network features into the network profile system.

During the client ordering process, the profiles created by the network profile system 100 allows the customer to specify the values of only the parameters of the client-specific network features. In other words, by referencing the stored customer profile information in the network profile system, the client service order entry pages only generally require information that is client-specific. Thus, the network profile system 100 simplifies client ordering by minimizing the amount of technical information required during client service order entry.

Upon completion of the specification of the network profiles, the customer returns to the CFI 50. It is noted that the customer may return to the network profile management system 100 at subsequent times as necessary or as desired.

Figure 2:
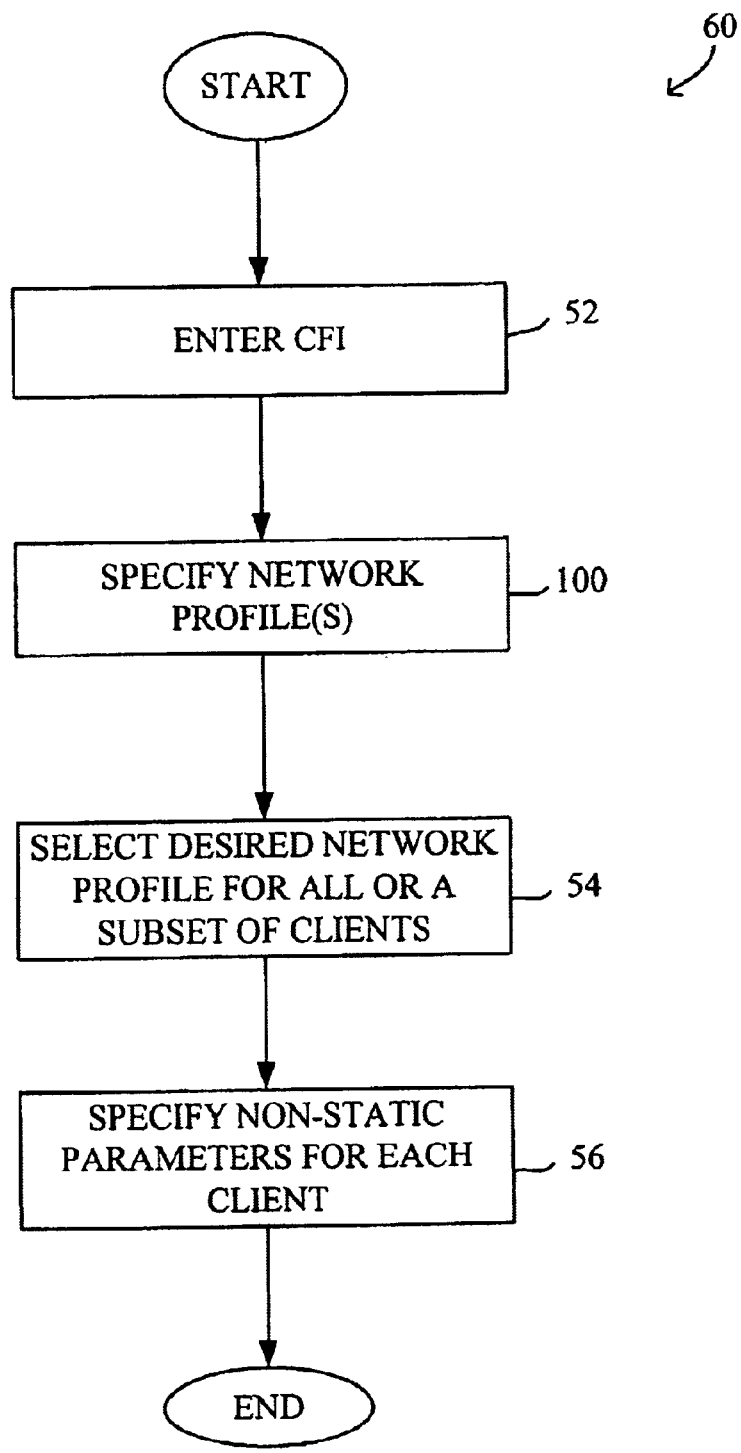
FIG. 2 is a flow chart illustrating a process for specification of network configurations by a customer.

FIG. 2 is a flow chart illustrating a process 60 for specification of network configurations by a customer. At step 52, the customer enters the CFI. The customer may perform various tasks as necessary or as desired at the CFI. When the customer desires to specify one or more network profiles, the process 60 proceeds to step 100. when the specification of the network profile(s) is complete, the customer may then select one of the network profiles from its list of available network profiles at step 54. Then, at step 56, the customer may then specify proceed to enter the values of non-static or client-specific parameters in the client ordering process. As noted above, the client ordering process of step 56 allows the customer to only specify the values of the parameters of the client-specific network features, thereby simplifying the client service order process.

Network Profile

Prior to describing the network profiling process 100, a network profile will be generally described. A network profile typically defines the CPE modes and features desired by the customer and validated by the network profile system.

Network Modes

A network profile includes the network modes and network features selected by the customer that the customer desires to support. Network modes refer to CPE methods of behavior which have associated feature capabilities. Modes may be categorized by type, such as forwarding type and WAN encapsulation type. Within a given mode type, only one of the possible modes may be selected. Examples of forwarding type mode include bridging mode and routing mode. Examples of WAN encapsulation type mode include multi-protocol mode and PPP mode. A particular CPE may support one or more of the modes. Because only one of the possible modes may be selected within a given mode type, the validation process of the network profile system ensures that at most one mode is selected for each mode type.

Network Features

Each of the modes defines which network features that may be further configured. Network features refer to configurable CPE methods of behavior. The features may be categorized into various categories such as mode, feature type, and CPE support. FIG. 3 is a table illustrating some examples of features and their categorization. Each of the categories will be described below.

For features associated with a particular mode, a given CPE must support that mode in order for the CPE to support the features associated with that mode. Each feature associated with a mode may be further categorized as having CPE support status of "always" or "verify". A feature having a CPE support status of "always" indicates that the feature is always supported by all the CPEs that support the associated mode. A feature having a CPE support status of "verify" indicates that the features is only supported by some of the CPEs that support the associated mode.

The features may also be categorized by feature type such as, for example, a general type, an IP address type, a DHCP type, a LAN or WAN IP type, a LAN or WAN routing protocol type, or an authentication type. The feature types may be such that within a feature type, other than the general type, only one feature may be selected. In other words, the features within a feature type other than the general type are mutually exclusive. Because only one of the possible features may be selected within a given feature type, the validation process of the network profile system ensures that at most one feature is selected for each feature type.

It is noted that some features types can be shared by more than one mode. In the example shown in FIG. 3, feature type IP address is shared by the bridge mode and the PPP mode, feature type DHCP is shared by the bridge mode and the route mode, and feature type WAN IP is shared by the bridge mode and the PPP mode. If multiple modes having a common feature type are selected, the network profile system preferably allows the selection of one of the features from the union or combination of the features belonging to the common feature type of the multiple modes.

Features belonging to the general type can be optionally selected and generally have no relationship relative to each other. For features that must be included or excluded, these features are preferably not selectable and its value or state cannot be varied by the customer, although some or all of which may be displayed with an indication of its inclusion or exclusion.

As shown in FIG. 3, a feature may have additional dependencies upon other modes or features. For example, for the system name, login, and SNMPv1 features for the bridge mode, the selection of any of these features may require selection of the IP enabled or PPP assigned feature of the IP address feature type. In addition, selection of the NAT feature of the General feature type for the route mode may require selection of the numbered or PPP assigned WAN IP.

Network Feature Parameters

The network features typically have associated parameters, i.e., information used by the features and which have associated values. FIG. 4 is a table illustrating examples of features, their associated parameters, if any, default parameter values, if any, and default static or non-static (or dynamic) status, if applicable. Some network parameters may not have parameters or parameter values associated therewith. For example, some network features and/or parameters are enabled by its selection and no further specification is needed in order to define the parameter. Where a network feature does not have a parameter or parameter value associated therewith, the feature can be referred to as feature or parameter interchangeably for purposes of discussion. For example, the feature "Unnumbered" does not have a parameter or value associated therewith. Thus, "Unnumbered" can be referred to as either a feature or a parameter.

The values of the parameters for the network features are the data used by the network profile system to populate the parameter fields. Preferably, upon selection of a feature, the parameters associated with that feature are displayed such that the customer may specify the associated values. Parameters or parameter values may be classified as required or optional. A parameter or its value is required if the value must be specified before service ordering process for a client is complete. Preferably, a default value for each parameter is provided by the network profile system. A parameter or its value is optional if the value may but need not be specified at the time of profile creation and/or during the client service ordering process.

The parameters may be specified as static or non-static. Each parameter preferably has a default static or default non-static, i.e., dynamic, status which may be changed, for example, by the customer. Static parameters generally have the same values for all clients that utilize the given network profile and are preferably specified at the time of profile creation by the customer. Static parameters are preferably not displayed during the client service ordering process so as to simplify the client service ordering process. Alternatively, the static parameters and their associated values may be display but cannot be altered during the client service ordering process. In contrast, non-static or dynamic parameters are determined and specified on a client-by-client or an order-by-order basis during the client service ordering process. Preferably, only the non-static or dynamic parameters are the only parameters which need to be specified during the client service ordering process.

Network Profile Templates

The network profile system 100 preferably provides one or more network profile templates. FIG. 5 shows four sample templates and their associated modes and features. The four templates shown are Bridging, Static Routing, WANRIP Routing and BothRIP Routing. Each network profile template preferably specifies a mode and a set of associated predefined features and parameters. In particular, the set of predefined features and parameters for each template is preferably selected by the LEC from well-defined and well-understood features sets. The values of the parameters for each of the templates are preferably the default values.

If an unmodified template is used as a network profile, it need not be validated as the network profile system preferably only provides validated templates. However, if the template is utilized as a basis for creating a profile which differs from the template, then validation process is preferably performed.

The network profile system 100 preferably also allows the customer to define its own templates as desired and/or to utilize one of its predefined network profiles as the basis for creating another network profile. For example, the customer may wish to specify multiple profiles which are somewhat similar to each other. Thus, allowing the customer to define its own template would further simplify the order entry process.

Similar to the profiles created by the customer, each profile template preferably has a unique name or identifier associated therewith such that references to and access of the profiles or the profile templates can be easily achieved.

Validation by the Network Profile System and Process

As noted the discussion above, the network profile system and process incorporates a validation system and process in order to validate each specification throughout the profile creation process. If the validation returns an invalid flag, for example, the network profile system preferably displays the problem and requests reentry of the input. In addition, the network profile system may also suggest possible valid entries in order to further simplify the service order process.

Network Profiling Process

Figure 6:
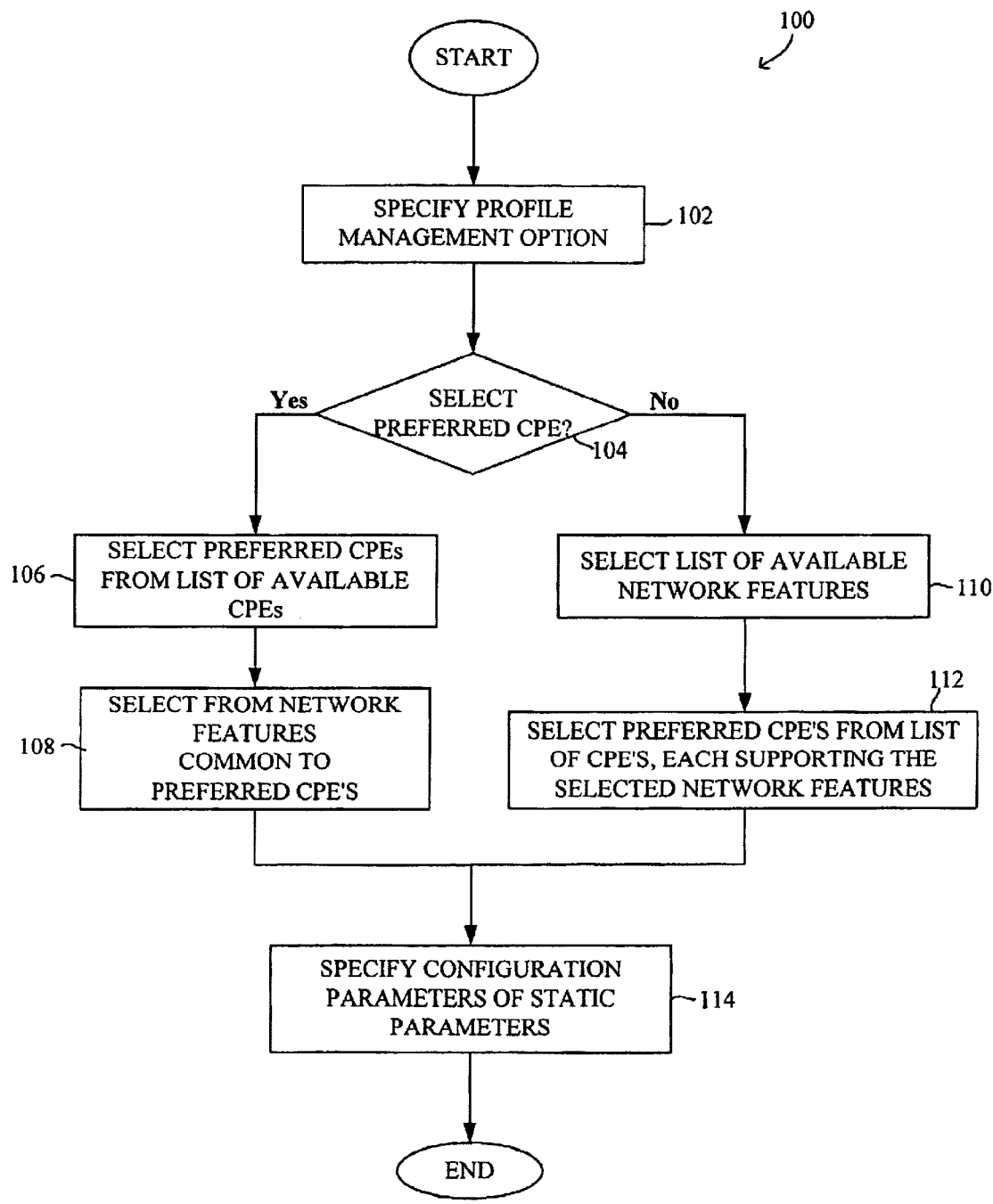
FIG. 6 is a flow chart illustrating a process for specifying each network profile.

FIG. 6 is a flow chart illustrating the process 100 for specifying each network profile by creating a new network profile, by editing a previously specified network profile, by continuing the specification of an in-progress network profile, or by deleting a previously specified network profile, for example. The process 100 generally includes specifying the profile management option (e.g., create, edit, delete), selecting preferred CPEs and selecting network features supported by all preferred CPEs, and specifying the configuration parameters of static configuration parameters. Alternatively, rather than selecting preferred CPEs and selecting network features supported by all preferred CPEs, the customer may select desired network features and select the preferred CPEs from the list of CPEs supporting the selected features. Each of these steps will be described in more detail below.

In the profile management option specification step 102, an interface preferably allows the customer to select one of create, modify, or delete a network profile. It is noted that FIG. 6 generally illustrate the process of editing or creating a network profile although, for purposes of clarity, the discussion is generally in terms of creating a new network profile. Further, a previously created network profile that may be edited can be a complete or partially complete network profile. In other words, the network profile process allows a customer to began specifying a network profile and save the in-progress, incomplete profile until a later time. Although not shown, the process for deleting a previously specified network profile may include, for example, selection of the previously specified network profile to be deleted and a request by the network profile system for confirmation that the customer wishes to delete the selected network profile.

As noted, at step 102, the customer may select the option to edit a previously created profile or to create a new profile, such as using a profile template as-is or as a basis for a new profile, or without the use of a profile template. In addition, the network profile process preferably provides a listing of all available profiles, complete or incomplete, corresponding to the customer such that the customer may select the desired available profile(s) for editing or deletion at step 102.

At step 104, the customer may choose to select one or more preferred CPEs. If the customer chooses to select one or more preferred CPEs, the network profile system displays a list of available or supported CPEs from which the customer may select at step 106. For example, the customer may select only CPEs from Cisco Corporation and/or from FlowPoint Corporation. Preferably, the network profile system provides information such as the supported modes and features associated with each available CPE, such as via a display of such information or via a link to such information. In addition, if the LEC provides a variety of services each identified by a unique name, the services supported by each CPE are preferably also displayed. After the preferred CPEs are selected at step 106, the network features common to, compatible with, or supported by the selected preferred CPEs are compiled and displayed. At step 108, the customer may select the network features the customer desires to enable from the list of network features compiled and displayed.

Alternatively, if the customer does not select the preferred CPEs, the network profiling process proceeds to step 110. At step 110, the customer may select network features the customer desires to enable from a list of available network features. A list of CPEs supporting the network features selected at step 110 is compiled and displayed. At step 112, the customer may select preferred CPEs from the list of CPEs supporting the network features selected by the customer.

Although shown as separate steps, it is to be understood that after step 102, the network profile process may proceed directly to step 106 to display available CPEs and, if no preferred CPEs are selected, the network profile process may then proceed to step 110.

At step 114, after the network features and the preferred CPEs have been selected, the customer may specify configuration parameters for the network features which are static. As noted, static network features refer to those network features which are not client-specific and are common to all clients that will utilize the particular network profile being defined. In addition, non-static or dynamic network features refer to those network features which are client- or order-specific and which may be determined and specified on a client-to-client or order-to-order basis. By specifying which network features are static, the remaining non-static network features can vary from client to client or from order to order. Thus, only those network features which are non-static are displayed and whose values are requested when ordering service for specific clients.

Once the profile is specified after step 114, the profile is saved and is then made available in profile management. The network profile process 100 can be repeated as desired to specify any number of profiles by the customer, for example. It is to be noted that although the customer is described as performing the network profile specification process, any other party such as the LEC may do so for the customer.

Although not explicitly shown, each of steps 106, 108, 110, 112, and 114 also includes a validation or verification component as described above. For example, the verification component of step 114 may verify that the values specified for each configuration parameters are within predefined limits and/or are compatible with other specified features or parameters.

In addition, as is evident, the network profiling system includes a database of supported or available CPEs, where the database preferably also includes information on each of the CPEs in the database, such as the mode type and the modes the CPE supports. The network profiling system also includes various rules and/or an engine for the verification or validation process such that the validation process can determine any conflicting or incompatible selections of the customer. The network profiling system preferably also includes a set of predefined, validated templates as discussed above.

While the above is a complete description of preferred embodiments of the invention, various alternatives, modifications, and equivalents can be used. For example, the network profile system may be utilized for ordering cable modem service for clients by customer. Therefore, the above description should not be taken as limiting the scope of the invention that is defined by the appended claims along with their full scope of equivalents.

What is claimed is:

1. A network profiling system, comprising:
a database of supported CPEs;
a database of mode types corresponding to each supported CPE;
a database of modes corresponding to each mode type for each support CPE;
a database of features corresponding to each mode;
a database of parameters corresponding to each feature; and
a validation engine for validating selections of mode, feature, parameter, and value of parameter.

2. A network profiling system according to claim 1, wherein said validation engine comprises rules for determining invalid selections of mode, feature, parameter, and value of parameter.

3. A network profiling system according to claim 1, further comprising a database of default values for each parameter.

4. A network profiling system according to claim 1, further comprising at least one profile template, each profile template having a set of predefined mode, feature, parameter, and value of parameter.

* * * * *